US 6,496,457 B1

(12) United States Patent
Takahashi

(10) Patent No.: US 6,496,457 B1
(45) Date of Patent: Dec. 17, 2002

(54) DISK REPRODUCING SYSTEM

(75) Inventor: Yorio Takahashi, Ehime (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/890,272

(22) PCT Filed: Feb. 9, 2000

(86) PCT No.: PCT/JP00/00711
§ 371 (c)(1),
(2), (4) Date: Nov. 6, 2001

(87) PCT Pub. No.: WO00/48189
PCT Pub. Date: Aug. 17, 2000

(30) Foreign Application Priority Data

Feb. 12, 1999 (JP) ............................. 11-033885

(51) Int. Cl.$^7$ ............................. G11B 19/28
(52) U.S. Cl. ................... 369/47.38; 369/53.3
(58) Field of Search ............... 369/47.38, 53.2, 369/53.3

(56) References Cited

U.S. PATENT DOCUMENTS 6,026,068 A * 2/2000 Obata et al. ............... 369/53.2

FOREIGN PATENT DOCUMENTS

| JP | 7-312011 | 11/1995 |
| JP | 8-45170 | 2/1996 |
| JP | 9-306094 | 11/1997 |
| JP | 10143994 | 5/1998 |
| JP | 10222919 | 8/1998 |
| JP | 10283724 | 10/1998 |
| JP | 200067512 | 3/2000 |

OTHER PUBLICATIONS

English Language of Abstract of JP 8–451270.
English Language of Abstract of JP 9–306094.
English Language of Abstract of JP 10–143994.
English Language of Abstract of JP 10–222919.
English Language of Abstract of JP 2000–67512.
English Language of Abstract of JP 7–312011.
English Language of Abstract of JP 10–283724.

* cited by examiner

Primary Examiner—Aristotelis M. Psitos
(74) Attorney, Agent, or Firm—Greenblum & Bernstein, P.L.C.

(57) ABSTRACT

To provide a disk playback system that effectively uses the maximum playback speed and maximum search speed that the system owns.

A disk playback system that searches for a desired position of a disk (2) on which information data is recorded at constant linear velocity after receiving a command from an external device, reads out desired information data, and outputs information data corresponding to the playback format of the disk. An outermost-perimeter-address memory circuit (21) renews stored address information to the newest address information, if the address information of the newest address accessed according to an access instruction of said disk indicates the newest address is outer perimeter than the outermost address that has been accessed, and determines a criterion for speed control of the disk (2), based on the renewed address information. A CAV control circuit (20) controls the speed of the disk 2, based on the determined criterion.

4 Claims, 2 Drawing Sheets

DISK REPRODUCING SYSTEM

TECHNICAL FIELD

The present invention relates to a disk playback system that is used in a CD-ROM playback apparatus or the like that reads out information recorded on a disk to transfer to an external device.

BACKGROUND ART

Taking a CD-ROM playback apparatus as an example, we describe a conventional kind of disk playback system. The CD-ROM playback apparatus receives a command from an external device such as a personal computer to search for a desired position and reads out desired data from the data recorded on a disk to transfer to an external device. An audio CD (compact disk) and a CD-ROM disk are recorded with a constant linear velocity (CLV) and supposed to be played back at one time the velocity.

In recent years, as personal computers increase their speed, high-speed readout and high-speed access are demanded for CD-ROM playback apparatus as a peripheral equipment of computers. In order to satisfy such demands, CD-ROM playback apparatuses that perform a constant high-speed readout at 2 times or 4 times the CLV or the like during playback time of a CD-ROM disk are now on the market. However, in order to raise search speed with constant high-speed readout at 2 times or 4 times the CLV or the like, loads on the disk motor that drives the disk become exceedingly large, so that there has been a problem that a large-sized disk motor at high cost is required.

Therefore, there are sold at a market CD-ROM playback D apparatuses that employ the CAV playback method that plays back at CAV (constant angular velocity) a disk that has been recorded at CLV, the wide-range CLV playback method that is CLV but has a very wide playback range and can perform high-speed searches and constant high-speed playbacks, or the PCAV (partial CAV) playback method that is a combination of the CAV playback method and the wide-range CLV playback method. CD-ROM playback apparatuses that employ these methods all realize high-speed searches by lightening the loads on their disk motors to use low-priced and compact disk motors.

Now, in a CD-ROM playback system that employs the above CAV playback method, wide-range CLV playback method, PCAV playback method, or the like, the maximum operation speed of the system, that is, the maximal processing capacity of signals is specified, and the system is constructed in such a way as the outermost perimeter of the disk is N times the velocity, if the maximum operation speed of the system is N times the velocity. However, in most disks, data is not recorded to the outermost perimeter, and the above speed is a playback criterion, even if the data-recorded area is small, so that there has been a lot of waste. Therefore, in the Japanese Patent Application No. 6-103878, there is proposed a disk playback system that operates in such a way as the criterion of disk playback speed is determined so as to obtain the maximum search speed and high-speed readout, depending on the outermost perimeter of the data-recorded area.

DISCLOSURE OF INVENTION

In the above disk playback system, the criterion of the disk speed control is, as mentioned above, the outermost perimeter of the data-recorded area in which data is recorded. Therefore, the playback speed criterion mentioned above is used even if only the data near the inner perimeter of the disk, of the data recorded on the disk, is actually used, or the use frequency of the data at the outer perimeter is very low. Therefore, in the above disk playback system, there has been a problem that the maximum playback speed and maximum search speed that the system owns cannot be effectively used.

An object of the present invention is to provide a disk playback system that effectively uses the maximum playback speed and maximum search speed that the system owns.

The disk playback system stated in claim 1 of the present invention searches for a desired position of a disk on which information data is recorded at a constant linear velocity when received a command from an external device, reads out desired information data from the aforementioned information data, and outputs information data corresponding to the playback format of the aforementioned disk, being characterized in that the playback system is equipped with a determining means that, if the address information of the newest address accessed by an access instruction of the disk is address information indicative of an address outer than the outermost address that has been accessed, renews stored address information to the address information of the newest address, and determines a criterion for speed control of the disk, based on the newest renewed address information, and a rotation control means that controls the speed of the disk, based on the criterion determined by the determining means.

When a disk is played back in a system whose maximum processing capacity is N times the CLV, and if an approximately inner one half area of the data to be played back has been used, for example, the above determining means determines the speed criterion so as to perform processing at that position, i.e., the outermost track position that has been accessed, at N times the velocity, i.e. the maximum processing capacity. When receiving an access instruction for a further outside perimeter, the determining means determines again the speed criterion. By this means, the maximum search speed and high-speed readout can be obtained, depending on the outermost perimeter of the data-recorded area that has been accessed.

The disk playback system stated in claim 2 of the present invention is characterized in that in the disk playback system of claim 1, the aforementioned rotation control means is a CAV control circuit that rotates the disk at a constant angular velocity (CAV).

When a disk is played back in a system whose maximum processing capacity is N times the velocity (CLV), and if an approximately inner one half area of the disk to be played back has been used, for example, the above determining means determines the speed criterion for the angular velocity of the disk so as to perform processing at that position, i.e., the outermost track position that has been accessed, at N time the velocity, i.e. the maximum processing capacity. At this time, the speed at the innermost perimeter becomes N/1.6 times the velocity, and the criterion speed for readout becomes high. When receiving an access instruction for a further outside perimeter, the determining means determines again the speed criterion. By this means, the maximum search speed and high-speed readout can be obtained, depending on the outermost perimeter of the data-recorded area that has been accessed.

The disk playback system stated in claim 3 of the present invention is characterized in that, in the disk playback system of claim 1, the rotation control means is equipped with a CLV control circuit that rotates the disk at the constant linear velocity (CLV) and a variable clock generating circuit that supplies the CLV control circuit with a comparison clock that varies with the output of the determining means.

When a disk is played back in a system whose maximum processing capacity is N times the velocity, and if an approximately inner one half area of the disk to be played back has been used, for example, the above determining means determines the speed criterion for the linear velocity of the disk so as to be able to perform processing at that position, i.e., the outermost track position that has been accessed, at N times the velocity, i.e. the maximum processing capacity. At this time, N/1.6 becomes the criterion for CLV, and readout speed becomes high. When receiving an access instruction for a further outside perimeter, the determining means determines again the speed criterion. By this means, the maximum search speed and high-speed readout can be obtained, depending on the outermost perimeter of the data-recorded area that has been accessed.

The disk playback system stated in claim 4 according to the present invention searches for a desired position of a disk on which information data is recorded at a constant linear velocity, when received a command from an external device, reads out desired information data from the aforementioned information data, and outputs information data corresponding to the playback format of the disk, being characterized in that the playback system is equipped with a determining means that, if the address information of the newest address accessed by an access instruction of the aforementioned disk is address information indicative of an address outer perimeter than the outermost address that has been accessed, renews stored address information to the address information of the newest address, and determines a criterion for speed control of the disk, based on the newest renewed address information, and also equipped with a first rotation control means that rotates the disk at constant angular velocity (CAV), based on the criterion determined by the determining means, a second rotation control means that rotates the disk at constant linear velocity (CLV), and a switching means that switches the first and second rotation control means.

When a disk is played back in a system whose maximum processing capacity is N times the velocity, and if an approximately inner one half area of the disk to be played back has been used, the above determining means determines a speed criterion for the angular velocity and linear velocity of the disk so as to be able to perform processing at that position, i.e., the outermost track position that has been accessed, at N times the velocity, i.e. the maximum processing capacity. At this time, when the disk is rotated at constant angular velocity (CAV), by using the first rotation control means, the speed at the innermost perimeter becomes N/1.6 times the velocity, and the criterion speed for readout becomes high. When the disk is rotated at constant linear velocity (CLV), using the second rotation control means, N/1.6 becomes the criterion for CLV, and readout speed becomes high. When receiving an access instruction for a further outside perimeter than the stored address, the determining means determines again the speed criterion. By this means, the maximum search speed and high-speed readout can be obtained, depending on the outermost perimeter of the data-recorded area that has been accessed.

BEST MODE FOR CARRYING OUT THE INVENTION

In the following are described some embodiments of the present invention with reference to the attached drawings.

First Embodiment

Figure 1:
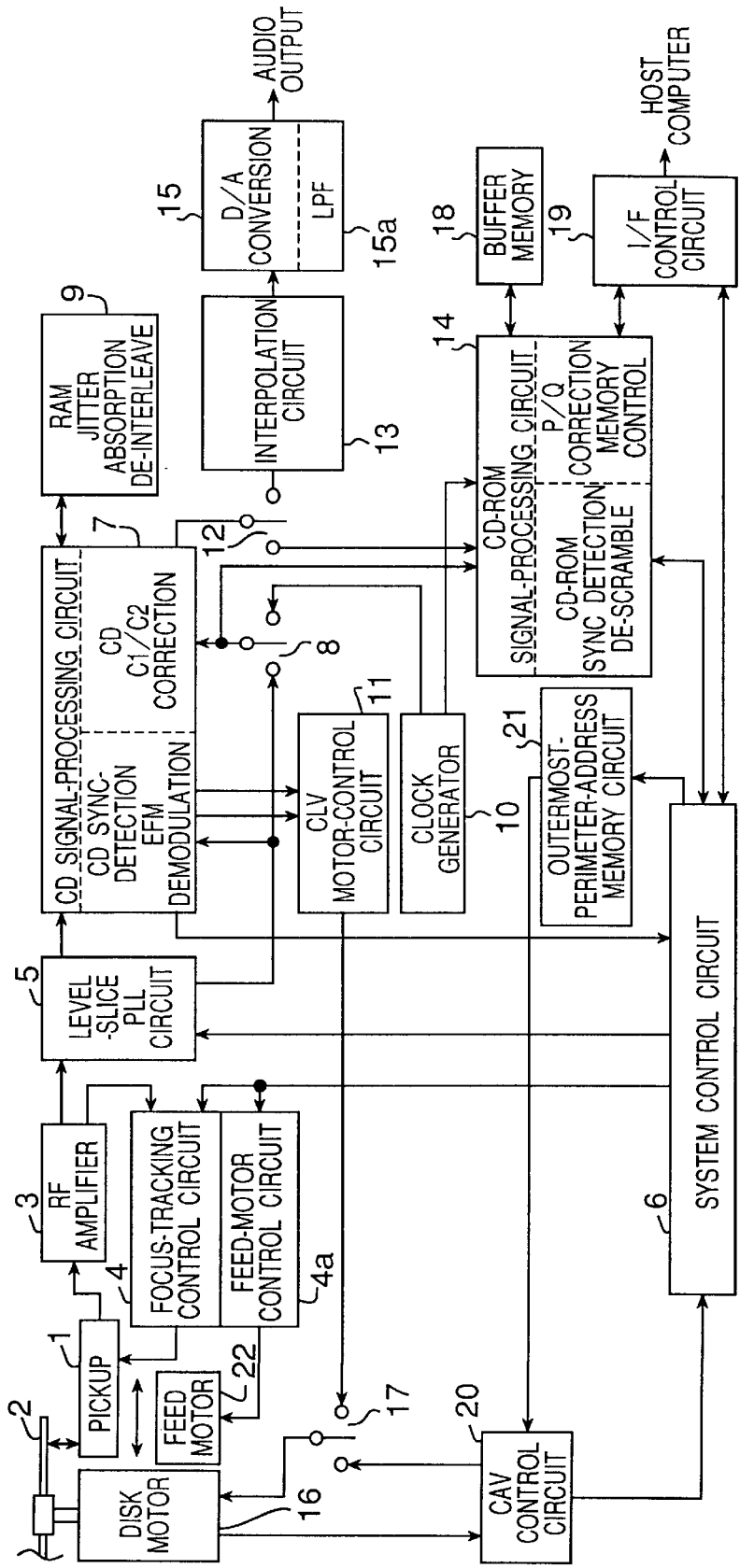
FIG. 1 is a block diagram of a CD-ROM apparatus in which the present invention has been applied to a CAV playback system.

The system configuration of a CD-ROM apparatus in which the present invention has been applied to the CAV playback system is shown in FIG. 1. Here, the disk playback system of the present embodiment can also play back an audio CD and is switched to CLV playback mode during an audio playback.

As shown in FIG. 1, a signal read out from a disk 2 by an optical pickup 1 is supplied to an RF amplifier 3. The RF amplifier 3 extracts a focus-error signal, a tracking-error signal and the like from the output of the optical pickup 1 to supply to a focus-tracking control circuit 4 and a feed-motor control circuit 4a, while supplying a level-slice PLL circuit 5 with the amplified RF signal. The level-slice PLL circuit 5 binarizes the RF signal to generate an EFM signal and also generates a PLL clock in sync with the EFM signal for reading the EFM signal. The above focus-tracking control circuit 4 and the feed-motor control circuit 4a respectively control the optical pickup 1 and a feed motor 22 in order that the focus-error signal and the tracking-error signal become zero.

Now, the switching between CAV playback mode and CLV playback mode is performed by an audio/ROM switching-instruction signal that is output from a system control circuit 6. As stated already, when an audio CD is played back, the mode is the CLV playback, and when a CD/ROM is played back, the mode is the CAV playback.

The binarized EFM signal is supplied to a CD signal-processing circuit 7. Also, the above PLL clock is supplied to the CD signal-processing circuit 7 and a selector 8. The CD signal-processing circuit 7 detects a sync signal for the CD by using the PLL clock, performs data separation and EFM demodulation, and extracts only sub-code data from the demodulated data to supply to the system control circuit 6. Other main data is written into a RAM 9 with the PLL clock. The above CD signal-processing circuit 7 also reads data out from the RAM 9 to perform CD correction processing, based on the clock supplied from a clock generator 10 through the selector 8.

The above CD correction processing is performed with the PLL clock in the playback system output from the level-slice PLL circuit 5 during a CAV playback, and performed with an X'TAL system clock output from the clock generator 10 during a CLV playback. Also, the detected sync signal for the CD and a frame-sync signal for a correction system are supplied to a CLV motor-control circuit 11. The correction-processed data is supplied to an interpolation circuit 13 or a CD-ROM signal-processing circuit 14 through a selector 12.

The switching in the above selector 8 and the switching in the selector 12 are performed by an audio/ROM-switching instruction signal output from the system control circuit 6. The above selector 12 supplies data to the interpolation circuit 13 when the audio/ROM-switching instruction signal is audio, and supplies the correction-processed data to the CD-ROM signal-processing circuit 14 when the signal is ROM.

The above interpolation circuit 13 performs the interpolation of data only if an error flag is attached to the data, and supplies its output to a D/A converter 15. The D/A converter 15 converts data from digital to analog to output as a played-back audio signal through an LPF (low-pass filter) 15a.

The CLV motor-control circuit 11 compares the sync signal for the CD with the frame sync signal for the correction system on frequencies and phases to extract an error component and generates a drive signal for a disk motor 16 to supply to a selector 17. The above CLV motor-control circuit 11 specifically compares the sync signal of 7.35 KHz for the CD with the frame sync signal of 7.35 KHz for the correction system on frequencies and phases.

The above CD-ROM signal-processing circuit 14 performs the detection of CD-ROM synchronization and the release of scrambled data and performs the correction processing of CD-ROM data and the control of writing and reading data into and out of a buffer memory 18. For the detection of CD-ROM synchronization and the release of scrambled data, the processing is performed with the clock supplied from the selector 8. Also, the above correction processing of data and the control of writing and reading data into and out of a buffer memory 18 are performed with the clock supplied by the clock generator 10. The data read out from the buffer memory 18 is transferred to a host computer, which is an external device, through an interface control circuit 19. Also, the above CD-ROM signal-processing circuit 14 detects a writable area of the buffer memory 18 to supply to the system control circuit 6.

The above interface control circuit 19 performs control of the communications on interfaces such as transmission of operation commands and transmission of data. The operation commands are transmitted between the system control circuit 6 and the host computer (not shown in FIG. 1) through the interface control circuit 19.

An outermost-perimeter-address memory circuit 21 stores an address of the outermost perimeter on the disk that has been accessed so far, performs comparison whenever access instructions are executed, rewrites the stored address value if the accessed address is further to the outside from the stored address, and determines a speed criterion value from the stored address position to supply a CAV control circuit 20 with the set value. Also, the outermost-perimeter-address memory circuit 21 recognizes a change of the disk 2 from a reset signal supplied by the system control circuit 6 to reset the retained address data of the outermost perimeter. The outermost-perimeter-address memory circuit 21 may set the initial value of the outermost address data as the data position of the innermost perimeter, but also may calculate the address where the playback speed at which the system can process becomes maximum when the speed of the disk motor 16 is maximum, and may set the initial value as that address value or a value having a margin to that address value.

The above CAV control circuit 20 generates a derive signal that rotates the disk motor 16 at a constant number of revolutions following the speed criterion value, from revolution detection pulses obtained from the disk motor 16 and the speed criterion value supplied by the outermost-perimeter-address memory circuit 21. The generated drive signal is supplied to the selector 17. Also, when the outermost address value is rewritten, the CAV control circuit 20 compares the revolution detection pulses obtained from the disk motor 16 with the speed criterion value from the outermost-perimeter-address memory circuit 21 to supply the system control circuit 6 with a read prohibit signal until the disk becomes a target speed.

Here, the system control circuit 6 performs operation control of the whole disk playback system such as searches and operation control of ON/OFF in each circuit and generates an instruction signal for the switching of audio/CD-ROM from the sub-code data demodulated in the CD signal-processing circuit 7 to supply to the level-slice PLL circuit 5 and the selectors 8, 12, 17. A search-instruction signal is supplied from the system control circuit 6 to the focus-tracking control circuit 4 and the feed-motor control circuit 4a.

Next, the operation of the disk playback system of FIG. 1, whose construction has been described, during a CD-ROM playback is described now. The outermost-perimeter-address memory circuit 21 stores the address of the outermost perimeter on the disk 2 that has been accessed. When an access instruction is issued from the host computer, the system control circuit 6 compares the last address of the data to be read out with the address value that is stored in the outermost-perimeter-address memory circuit 21, and if the last address is further to the outside from the stored address value, then the stored address value is rewritten. Then the system control circuit 6 determines the speed criterion value from the stored address position to supply to the CAV control circuit 20.

The CAV control circuit 20 generates a derive signal that rotates the disk motor 16 at a constant number of revolutions following the speed criterion value, from revolution detection pulses obtained from the disk motor 16 and the speed criterion value supplied by the outermost-perimeter-address memory circuit 21. The generated drive signal is supplied to the selector 17. Also, when the outermost address value is rewritten, the CAV control circuit 20 compares the revolution detection pulses obtained from the disk motor 16 with the speed criterion value from the outermost-perimeter-address memory circuit 21 to supply the system control circuit 6 with a read prohibit signal until the disk becomes a target speed. The system control circuit 6 moves the optical pickup 1 to a target address with the feed-motor control circuit 4a and starts the playback of data after confirming that the read prohibit signal is not output. The played-back data is processed by the RF amplifier 3, the level slice PLL circuit 5, the CD signal-processing circuit 7, and the CD-ROM signal-processing circuit 14, and then transferred to the host computer through the I/F control circuit 19.

Second Embodiment

Figure 2:
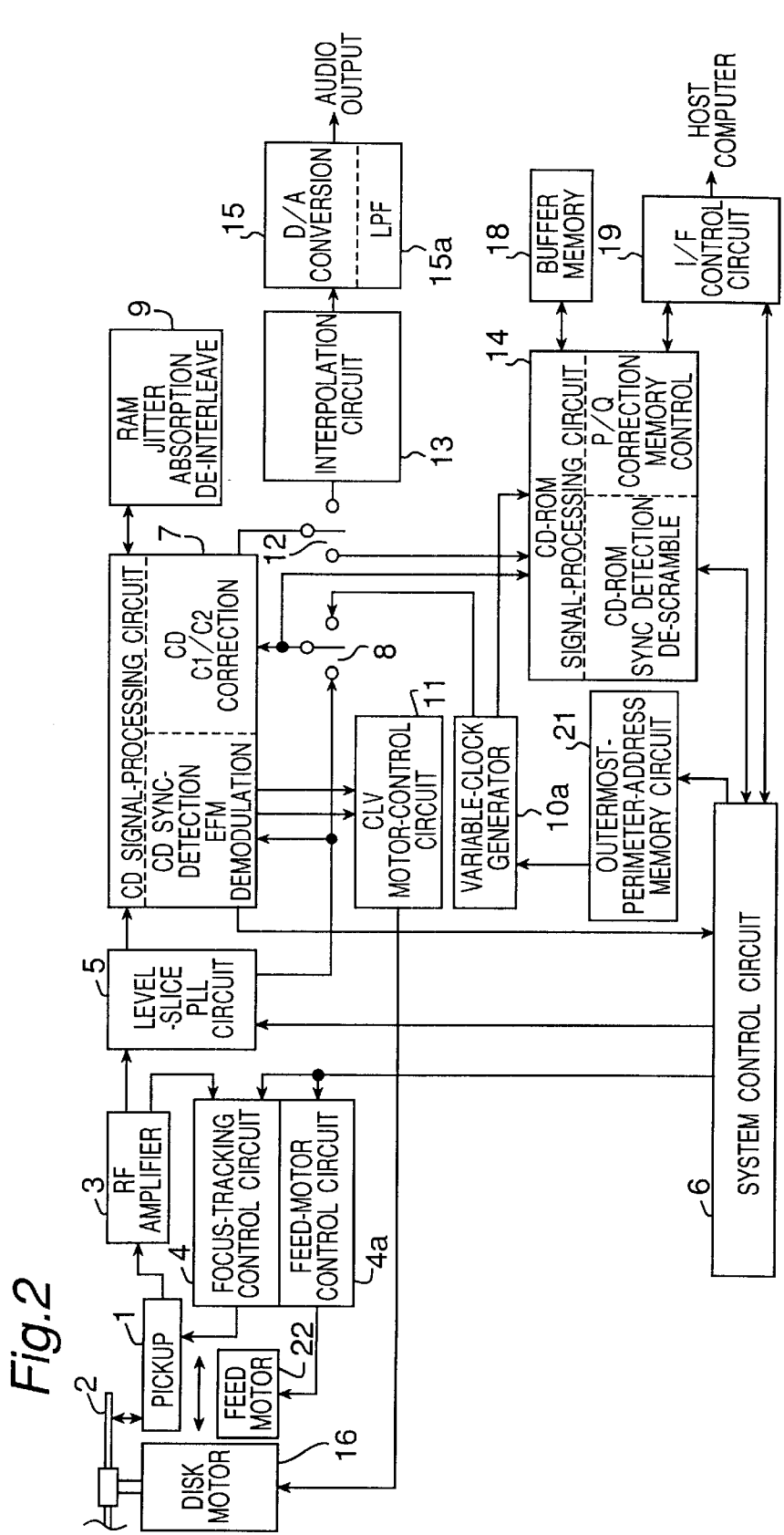
FIG. 2 is a block diagram of a CD-ROM apparatus in which the present invention has been applied to a wide-range CLV playback-system.

The system configuration of an embodiment that applies the present invention to the wide-range CLV playback system is shown in FIG. 2. Here, the disk playback system of the present embodiment can also play back an audio CD as the disk playback system of the first embodiment and is switched to CLV playback mode during an audio playback.

As shown in FIG. 2, a signal read out from a disk 2 by an optical pickup 1 is supplied to an RF amplifier 3. The RF amplifier 3 extracts a focus-error signal, a tracking-error signal and the like from the output of the optical pickup 1 to supply to a focus-tracking control circuit 4 and a feed-motor control circuit 4a, while supplying a level-slice PLL circuit 5 with the amplified RF signal. The level-slice PLL circuit 5 binarizes the RF signal to generate an EFM signal and also generates a PLL clock in sync with the EFM signal for reading the EFM signal. The above focus-tracking control circuit 4 and the feed-motor control circuit 4a respectively control the optical pickup 1 and a feed motor 22 in order that the focus-error signal and the tracking-error signal become zero.

Now, the switching between wide-range CLV playback mode and audio playback mode is performed by an audio/ROM switching-instruction signal that is output from a system control circuit 6. As stated already, when an audio CD is played back, the mode is the CLV playback, and when a CD-ROM is played back, the mode is the wide-range CLV playback.

The binarized EFM signal is supplied to a CD) signal-processing circuit 7. Also, the PLL clock is supplied to the CD signal-processing circuit 7 and a selector 8. The CD signal-processing circuit 7 detects a sync signal for the CD by using the PLL clock, performs data separation and EFM demodulation, and extracts only sub-code data from the demodulated data to supply to the system control circuit 6. Other main data is written into a RAM 9 with the PLL clock.

CD correction processing is performed with the PLL clock in the playback system output from the level-slice PLL circuit 5 during a wide-range CLV playback, and performed with a clock in the X'TAL system output from a variable-clock generator 10 during a normal CLV playback. Also, the detected sync signal for the CD and a frame-sync signal for a correction system are supplied to a CLV motor-control circuit 11. The correction-processed data is supplied to an interpolation circuit 13 or a CD-ROM signal-processing circuit 14 through a selector 12.

The switching in the selector 8 and in the selector 12 is performed by an audio/ROM-switching-instruction signal 5 output from the system control circuit 6. When the audio/ROM-switching-instruction signal is audio, data is supplied to the interpolation circuit 13, and when the signal is ROM, the-correction-processed data is supplied to the CD-ROM signal-processing circuit 14.

The above interpolation circuit 13 performs the interpolation of data only if an error flag is attached to the data, and supplies its output to a D/A converter 15. The D/A converter 15 converts data from digital to analog to output as a played-back audio signal through an LPF (low-pass filter) 15a.

The CLV motor-control circuit 11 compares the sync signal for the CD with the frame sync signal for the correction system on frequencies and phases to extract an error component and generates and supplies a drive signal for a disk motor 16.

The CD-ROM signal-processing circuit 14 performs the detection of CD-ROM synchronization and the release of scrambled data and performs the correction processing of CD-ROM data and the control of writing and reading data into and out of a buffer memory 18. For the detection of CD-ROM synchronization and the release of scrambled data, the processing is performed with the clock supplied from the selector 8. Also, the above correction processing of data and the control of writing and reading data into and out of a buffer memory 18 are performed with the clock supplied by the variable-clock generator 10. The data read out from the buffer memory 18 is transferred to a host computer, which is an external device, through an interface control circuit 19. Also, the above CD-ROM signal-processing circuit 14 detects a writable area of the buffer memory 18 to supply to the system control circuit 6.

The above interface control circuit 19 performs control of the communications on interfaces such as transmission of operation commands and transmission of data. The operation commands are transmitted between the system control circuit 6 and the host computer through the interface control circuit 19.

An outermost-perimeter-address memory circuit 21 stores the address of the outermost perimeter on the disk that has been accessed, performs comparison whenever access instructions are executed, rewrites the stored address value if the accessed address is further to the outside from the stored address, and determines a speed criterion value from the stored address position to supply the variable-clock generating circuit 10a with the set value.

Also, the outermost-perimeter-address memory circuit 21 recognizes a change of the disk 2 from a reset signal supplied by the system control circuit 6 to reset the retained address data of the outermost perimeter. The outermost-perimeter-address memory circuit 21 may set the initial value of the outermost address data as the data position of the innermost perimeter, but also may calculate the address where the playback speed at which the system can process becomes maximum when the speed of the disk motor 16 is maximum, and may set the initial value as that address value or a value having a margin to that address value.

Here, the system control circuit 6 performs operation control of the whole disk playback system such as searches, operation control of ON/OFF in each circuit and generates an instruction signal for the switching of audio/ROM from the sub-code data demodulated in the CD signal-processing circuit 7 to supply to the level-slice PLL circuit 5 and the selectors 8, 12. A search-instruction signal is supplied from the system control circuit 6 to the focus-tracking control circuit 4 and the feed-motor control circuit 4a.

Next, the operation of the disk playback system of FIG. 2, whose construction has been described, during a CD-ROM playback is described now. The outermost-perimeter-address memory circuit 21 stores the address of the outermost perimeter on the disk 2 that has been accessed so far. When an access instruction is issued from the host computer, the system control circuit 6 compares the last address of the data to be read out with the address value that is stored in the outermost-perimeter-address memory circuit 21, and if the last address is further to the outside from the stored address value, then the stored address value is rewritten. Then the system control circuit 6 determines the speed criterion value from the address stored in the outermost-perimeter-address memory circuit 21 to supply the variable-clock generator 10a with the set value.

The system control circuit 6 moves the optical pickup 1 between target addresses with the feed-motor control circuit 4a and starts the playback of data. The played-back data is processed by the RF amplifier 3, the level slice PLL circuit 5, the CD signal-processing circuit 7, and the CD-ROM signal-processing circuit 14, and then transferred to the host computer through the I/F control circuit 19. In the present embodiment, the operation is performed at wide-range CLV, so that the playback can be started even if the playback speed is different from the speed indicated by the variable-clock generator 10a. Therefore, the CLV-motor control circuit 11 controls the disk motor 16 so that the playback speed becomes the playback speed indicated by the variable-clock generator 10a, while continuing the playback.

Other Embodiments

We have described embodiments in which the present invention is applied to CAV and wide-range CLV playback system, but the wide-range CLV system can be combined with the CAV system. That is, the clock generator 10 of FIG. 1 may be a variable-clock generator 10a, whereto the output of the outermost-perimeter-address memory circuit 21 may be supplied. At this time, the control of the selector 17 can arbitrarily select one of CAV and CLV playbacks depending on desired contents of data from an external device.

Industrial Applicability

As described in detail, according to the present invention, the address of the outermost perimeter having been accessed on a disk on which data is recorded at a constant linear velocity is stored, and the criterion speed can be set so that the maximum processing capacity of the system can be realized at that address position. Therefore, when only a part of the data near the inner perimeter of a disk is used, or the use frequency of data at the outer perimeter is low, processing at N times the velocity, which is the maximum processing capacity, can be achieved until data at the outer perimeter is accessed. In a system of the CAV playback method and the wide-range CLV method and in a system where these methods can be switched, the maximum playback speed and maximum search speed that the system owns for data can be effectively used.

What is claimed is:

1. A disk playback system that searches for a desired position of a disk on which information data is recorded at constant linear velocity after receiving a command from an external device, reads out desired information data from said information data, and outputs information data corresponding to the playback format of said disk, said disk playback system being characterized in that said playback system is equipped with a determining means that, if the address information of the newest address of said disk accessed according to an access instruction indicates the newest address is outer perimeter than the outermost address that has been accessed, renews recorded address information to the address information of the newest address, and determines a criterion for speed control of said disk, based on the renewed address information, and a rotation control means that controls the speed of said disk, based on said criterion determined by the determining means.

2. The disk playback system stated in claim 1 characterized in that said rotation control means is a CAV control circuit that rotates the disk at a constant angular velocity (CAV).

3. The disk playback system stated in claim 1 characterized in that, said rotation control means is equipped with a CLV control circuit that rotates a disk at a constant linear velocity (CLV) and a variable clock generating circuit that supplies said CLV control circuit with a comparison clock that varies with the output of said determining means.

4. A disk playback system that searches for a desired position of a disk on which information data is recorded at constant linear velocity after receiving a command from an external device, reads out desired information data from said information data, and outputs information data corresponding to the playback format of said disk, said disk playback system being characterized in that said playback system is equipped with a determining means that, if the address information of the newest address of said disk accessed according to an access instruction indicates the newest address is outer perimeter than the outermost address that has been accessed, renews recorded address information to the address information of said newest address, and determines a criterion for speed control of said disk, based on the renewed address information, and also equipped with a first rotation control means that rotates said disk at constant angular velocity (CAV), based on said criterion determined by the determining means, a second rotation control means that rotates said disk at constant linear velocity (CLV), and a switching means that switches these first and second rotation control means.

* * * * *

UNITED STATES PATENT AND TRADEMARK OFFICE
CERTIFICATE OF CORRECTION

PATENT NO.   : 6,496,457 B1
DATED        : December 17, 2002
INVENTOR(S)  : Y. Yakahashi It is certified that error appears in the above-identified patent and that said Letters Patent is hereby corrected as shown below:

<u>Title page,</u>
Item [56], References Cited, FOREIGN PATENT DOCUMENTS,
"9-306094" should be -- 9-306091 --.

Signed and Sealed this

Twenty-ninth Day of July, 2003

JAMES E. ROGAN
*Director of the United States Patent and Trademark Office*